(12) United States Patent
Sher et al.

(10) Patent No.: US 6,524,649 B1
(45) Date of Patent: Feb. 25, 2003

(54) METHOD OF ENHANCING COATING SPEED

(75) Inventors: Frank T. Sher, St. Paul, MN (US); Danny L. Fleming, Stillwater, MN (US); Mung-Lin S. Tan, Vadnais Heights, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 56 days.

(21) Appl. No.: 09/639,244

(22) Filed: Aug. 15, 2000

(51) Int. Cl.⁷ .............................................. B05D 5/10
(52) U.S. Cl. ........................ 427/207.1; 427/208.2; 427/208.4; 427/208.6; 427/261; 427/264; 427/270; 427/275; 427/299
(58) Field of Search .................. 427/207.1, 208.2, 427/208.4, 208.6, 261, 264, 270, 275, 299

(56) References Cited

U.S. PATENT DOCUMENTS

| | | |
|---|---|---|
| RE24,906 E | 12/1960 | Ulrich ........................ 206/59 |
| 3,239,478 A | 3/1966 | Harlan, Jr. .................. 260/270 |
| 3,935,338 A | 1/1976 | Robertson .................... 427/207 |
| 4,181,752 A | 1/1980 | Martens et al. ............ 427/54.1 |
| 4,952,650 A | 8/1990 | Young et al. ................ 526/194 |
| 5,169,727 A | 12/1992 | Boardman ................... 428/447 |
| 5,296,277 A | 3/1994 | Wilson et al. ................. 428/40 |
| 5,462,765 A | 10/1995 | Calhoun et al. ............. 427/198 |
| 5,650,215 A | 7/1997 | Mazurek et al. ............. 428/156 |
| 5,897,930 A | 4/1999 | Calhoun et al. ............ 428/41.8 |

FOREIGN PATENT DOCUMENTS

| WO | WO 98/29516 | 9/1998 |
|---|---|---|
| WO | WO00/44843 | 8/2000 |
| WO | WO00/69985 | 11/2000 |

*Primary Examiner*—Bernard Pianalto
(74) *Attorney, Agent, or Firm*—Dale A. Bjorkman; Carolyn V. Peters

(57) ABSTRACT

A method for coating includes applying an adhesive to a surface, wherein the surface comprises an arrangement of structures thereon, wherein the structures extend upward from a plane of the surface and have at least one sidewall that makes an angle with respect to the plane of the surface of greater than 0° and less than 90° selected to reduce air bubble formation for a coating solution of a selected rheology.

12 Claims, 3 Drawing Sheets

METHOD OF ENHANCING COATING SPEED

This invention relates to a method for applying a liquid composition to a structured surface. More particularly, the inventions relates to a method for applying adhesive compositions to a structured release liner.

BACKGROUND

Pressure sensitive adhesive-backed films may be imaged and adhered to a substrate for decorative purposes. For example, large graphics or smaller decals may be placed on vehicles or may be used as signs for identification, promotional or decorative objectives. However, the tacky and aggressive pressure sensitive adhesives used in these applications cause considerable handling and application problems. Ideally, the film is adhered conformably and evenly on the application substrate. Adhesive-backed articles that adhere with the slightest contact can often be particularly difficult to reapply if they inadvertently adhere to the substrate in an undesired position. In addition, even if one section of the adhesive backed article is properly positioned on a substrate, and the film is firmly adhered, air or other fluids may be trapped under the article. The trapped air forms a bubble in the article, and cannot be easily removed without de-bonding or perforating the article.

The adhesive backed graphic articles described in U.S. Pat. No. 5,897,930, WO 98/29516 and U.S. Ser. No. 09/311, 101 include an adhesive layer with a plurality of replicated recessed interconnecting microchannels that allow egress of fluids trapped under the article during registration with the substrate. A typical article 10 of this type is shown in FIG. 1, and includes a film 12 having opposed surfaces 14 and 16. The surface 14 of the film 12 is imaged to form a graphic 13. A layer of a pressure sensitive adhesive 18 is bonded to the surface 16 of the film 12. The pressure sensitive adhesive 18 includes a surface 20 that can be bonded to a substrate. The pressure sensitive adhesive 18 includes structures 22 that define a network of channels 24. A release liner 26 is releasably attached to the pressure sensitive adhesive 18. The release liner 26 includes protrusions 28 that form the corresponding channels 24 and structures 22 in the pressure sensitive adhesive 18. The release liner 26, shown in a partially removed state, is fully detachable when pulled in the direction of arrow A and is used to protect the pressure sensitive adhesive prior to application of the article 10 on a substrate.

A portion of a major surface of a liner used in making the article 10 is shown in FIG. 2. The surface of the liner 26 includes a pattern of ridges 28. The surface of the liner 26 includes a series of land areas 23 separated by the substantially continuous ridges 28. The ridges 28 have a substantially hemispherical cross sectional shape.

One convenient method for making the adhesive backed articles 10 includes knife or bar coating solutions of a pressure sensitive adhesive onto a structured surface of a release liner. Referring to FIG. 3, an apparatus 70 is shown that may be used to manufacture the adhesive article 10. A release liner 26 with a structured surface including ridges 28 is fed between a take up roll 72 rotating in the direction of arrow B and a back up roll 74 rotating in the direction of arrow C. A liquid adhesive 75 from a holding tank 76 adheres to the rotating take up roll 72 and is applied to the structured side of the release liner 26. A knife or bar 78 removes a portion of the adhesive 75 and forms a substantially continuous adhesive layer 79 on the release liner 26.

SUMMARY

As adhesive is applied to a structured release liner during the manufacture of adhesive backed articles using a knife or bar coating process, the adhesive flows over the structures on the surface of the release liner and fills in the land areas between the structures. In this process coating speed must be controlled to prevent entrapment or agglomeration of air bubbles in the adhesive as it flows into the individual cell-like regions in the land areas between the structures on the release liner. The entrapped air can degrade the performance of the coated adhesive layer and reduce the appearance and printability of the film layer, particularly for high resolution images. These defects detract from the overall appearance of products based on the adhesive backed articles. In addition, the reduced coating speeds are not economical and increase production costs.

The coating process of the invention uses a release liner having features that are mechanically modified to reduce air bubble formation during coating operations and enhance coating speed. The release liners used in the coating process of the invention have structures with geometries designed to reduce air bubble formation during coating and increase coating speed without sacrificing the application, bonding and visual properties of the final graphic film product.

In a first embodiment, the invention is a method for coating including applying an adhesive to a surface, wherein the surface comprises an arrangement of structures thereon. The structures extend upward from a plane of the surface and have at least one sidewall that makes an angle with respect to the plane of the surface of greater than 0° and less than 90° selected to reduce air bubble formation for a coating solution of a selected rheology. Preferably, the at least one sidewall makes an angle with respect to the plane of the surface of less than about 60°.

In a second embodiment, the invention is a method for making an adhesive backed article, including applying an adhesive to a release liner, wherein the a release liner includes an arrangement of structures thereon. The structures extend upward from a plane of the surface and have at least one sidewall that makes an angle with respect to the plane of the surface of greater than 0° and less than 90° selected to reduce air bubble formation for a coating solution of a selected rheology.

In a third embodiment, the invention is a method for reducing air entrapment in a coating process, including applying an adhesive to a surface with an arrangement of structures thereon. The structures extend upward from a plane of the surface and have at least one sidewall that makes an angle with respect to the plane of the surface of greater than 0° and less than 90° selected to reduce air bubble formation for a coating solution of a selected rheology.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1:
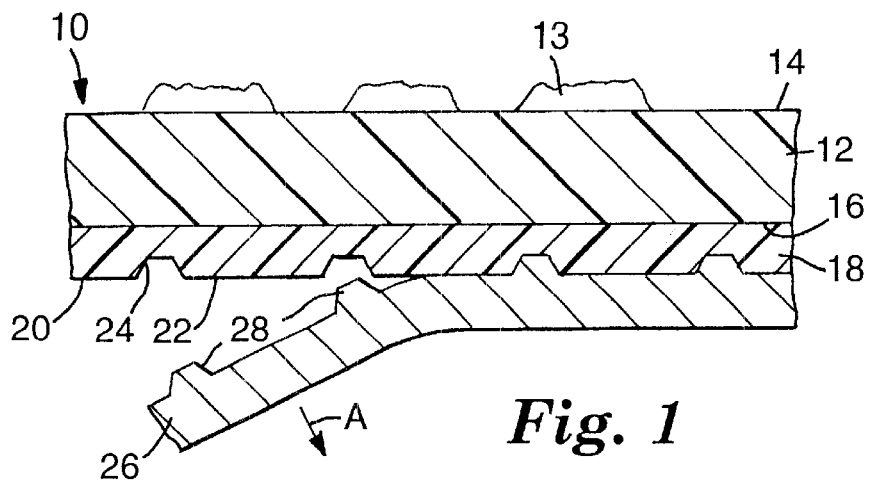
FIG. 1 is a cross-sectional view of an adhesive-backed graphic article.
Figure 2:
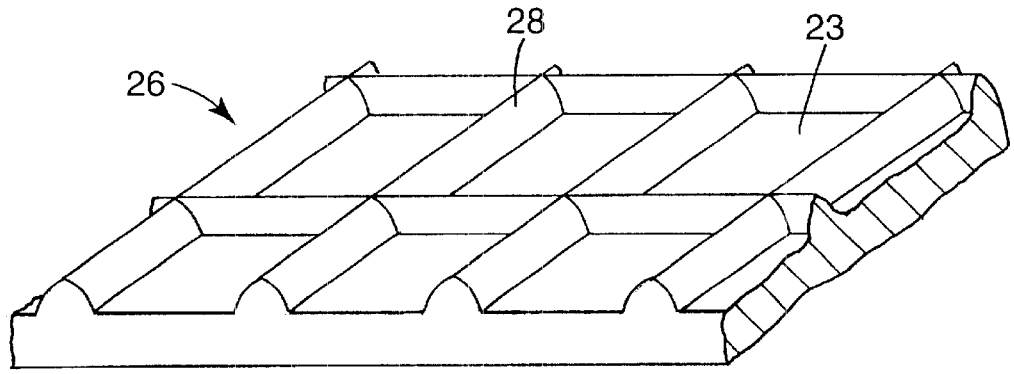
FIG. 2 is a perspective view of a release liner suitable for forming a structured surface in an adhesive layer.
Figure 4:
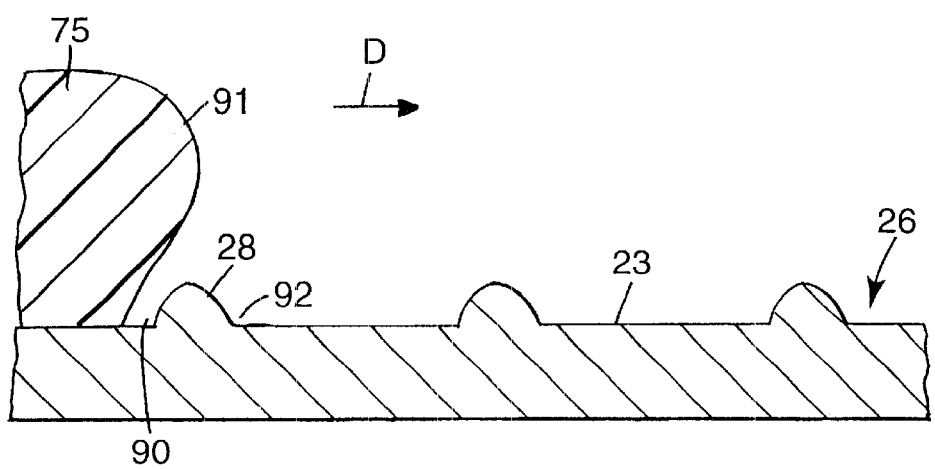
FIG. 4 is a schematic, cross-sectional view of a process for coating a release liner having a structured surface.
Figure 3:
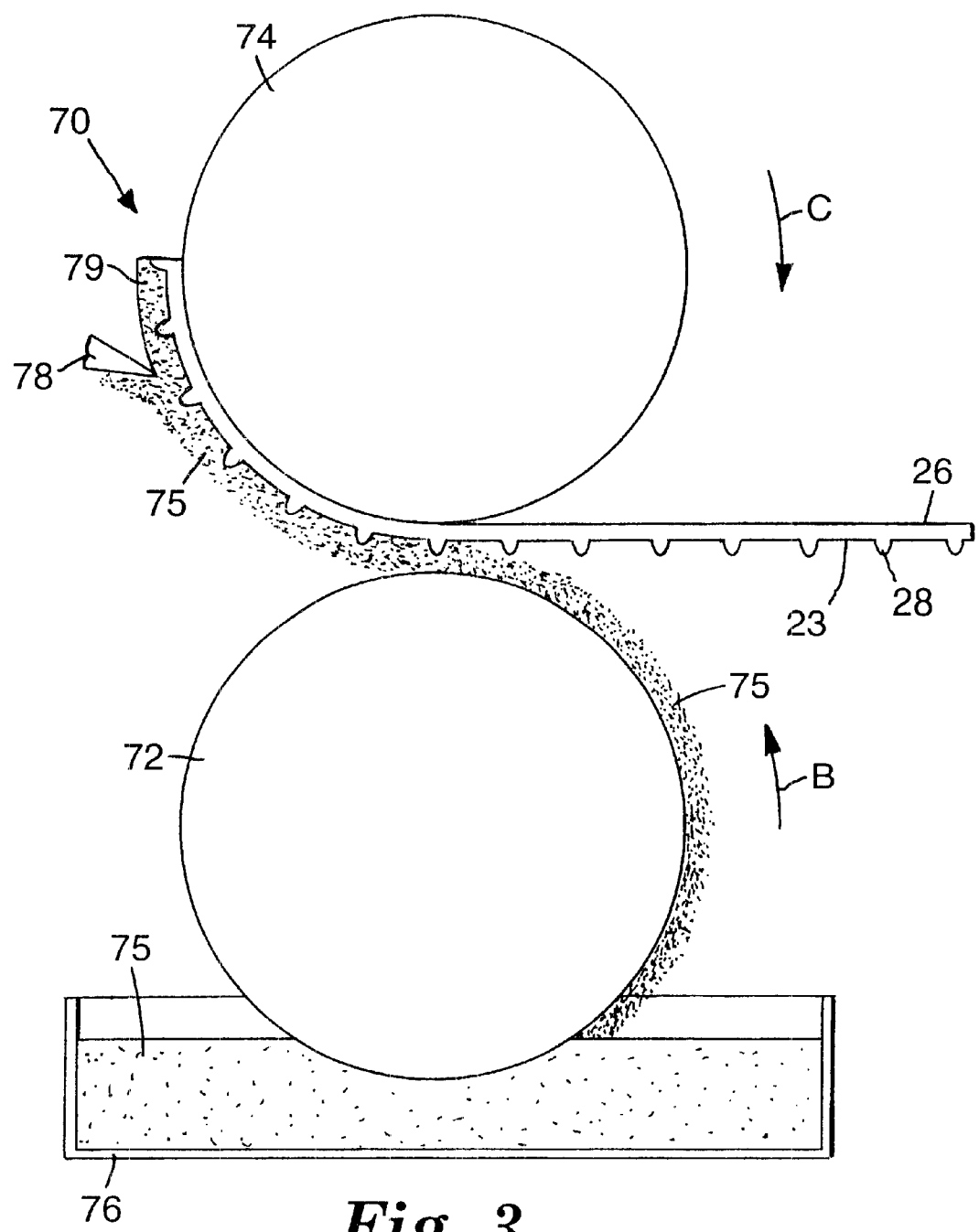
FIG. 3 is a schematic, perspective view of a coating apparatus used to manufacture adhesive backed articles on a release liner with a structured surface.

Referring to FIG. 4, a portion of the release liner 26 of FIG. 2, which includes ridge-like structures 28 separated by land areas 23, is shown during the coating process of FIG. 3. The liquid adhesive solution 75 advances in a direction D to coat the entire surface of the liner 26 and create a substantially continuous adhesive layer thereon. At high coating speeds, as the leading edge 91 of the liquid adhesive 75 advances over a ridge like structure 28, air bubbles may become trapped in an area 90 in front of the structure 28. In addition, as the leading edge 91 advances over the structure 28 and begins to fill in the land area 23, air bubbles may also become trapped at an area 92 behind the structure 28.

The coating process of the invention uses a release liner having structures thereon that are shaped to reduce this air bubble formation during coating operations. Since less air is entrapped in areas around the features during coating, these release liners may be coated at higher speed than conventional structured release liners. The structures on the release liners used in the coating process of the invention have geometries designed to reduce air bubble formation without substantial degradation of the application, bonding and visual properties of the final graphic film product.

Figure 5:
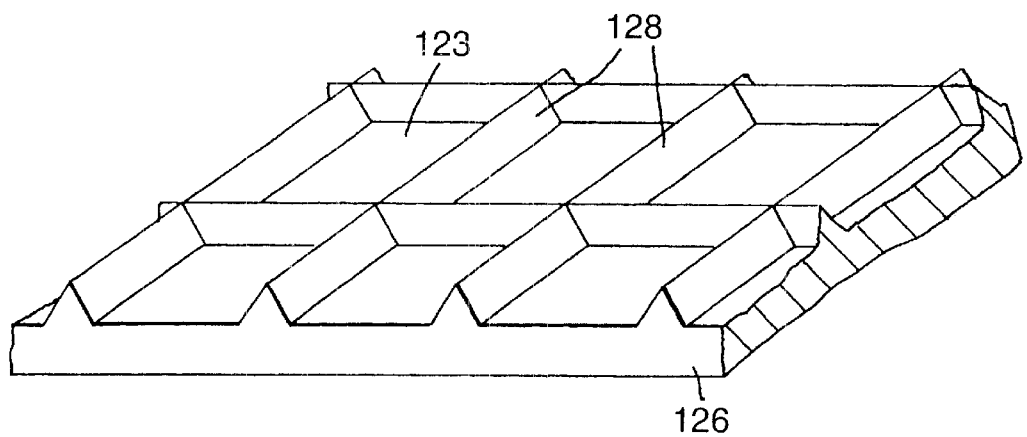
FIG. 5 is a perspective view of a release liner suitable for use in the coating process of the invention.

Referring to FIG. 5, a typical release liner 126 of that may be used in the coating process of the invention is shown, which includes a pattern of ridge-like structures 128. The structures 128 in the liner 126 may be made as described in WO 98/29516 and U.S. Pat. No. 5,650,215, which are incorporated herein by reference. The topography may be created in the liner 126 by any contacting technique, such as casting, coating or compressing. The topography may be made by at least one of: (1) casting the liner on a tool with an embossed pattern, (2) coating the liner onto a tool with an embossed pattern, or (3) passing the liner through a nip roll to compress the liner against a tool with an embossed pattern. The topography of the tool used to create the embossed pattern in the release liner 126 may be made using any known technique, such as, for example, chemical etching, mechanical etching, laser ablation, photolithography, stereolithography, micromachining, knurling, cutting or scoring.

The liner 126 may be any release liner or transfer liner known to those skilled in the art that is capable of being embossed as described above. The liner 126 should also be capable of being placed in intimate contact with a pressure sensitive adhesive and subsequently removed without damaging the adhesive layer. Non-limiting examples of liners include materials from Minnesota Mining & Manufacturing Company (3M) of St. Paul, Minn., Rexam Corporation of Iowa City, Iowa, or Daubert Coated Products of Westchester, Ill. The liner 126 is typically a polymer coated paper with a silicone release coating, a polyethylene coated polyethylene terepthalate (PET) film with silicone release coatings, or a cast polypropylene film with a silicone release coating. The liner 126 may also include structures designed to enhance the positionability of the adhesive article such as, for example, those in products available from 3M under the trade designation Controltac.

The liner 126 of the invention includes a structured pattern on an exposed surface suitable for contact with an adhesive. This pattern includes a configuration of protruding structures in which at least two dimensions of the structures are preferably microscopic, i.e. the topical and/or cross-sectional view of the structures is preferably microscopic. The term microscopic as used herein refers to dimensions that cannot be resolved by the human eye without aid of a microscope. The structures may be present in either a random array of structures or in regular patterns. Selected patterns could include rectilinear patterns, polar patterns and other conventional regular patterns.

The structures in the liner 126 are preferably substantially continuous. The term substantially continuous as used in this application means a pattern of structures that creates a substantially uninterrupted network of channels in the adhesive layer that is applied to the release liner in the adhesive backed construction. The continuous pattern of structures either terminates at the peripheral portion of the liner or communicates with other structures that terminate at a peripheral portion of the liner. The continuous structures are preferably substantially linear, and may be overlapping or non-overlapping. The structures in the liner 126 are also preferably substantially regular. The term regular means a pattern of structures that has a regular repeating pattern over at least a portion of the surface of the liner, preferably over the entire surface of the liner.

In a preferred embodiment, the regular and continuous structures are substantially linear ridges 128 that extend upwardly from a plane of a surface of the release liner 126. The ridges 128 may be overlapping or non-overlapping. As described in WO 98/295,116, incorporated herein by reference, the ridges 128 should be sized according to the following design considerations. First, the ridges should preferably be sufficiently large to allow egress of fluids to the periphery of the article, but not so large as to allow ingress of unwanted fluids beneath the article. Second, the ridges 128 should also not be so large as to detract from the appearance of the exposed surface of the film 112, particularly if the film 112 is to be imaged. Third, the ridges 128 should not be so large as to detract from the adhesive bonding performance of the article. In one preferred embodiment, the ridges 128 overlap one another in a cross-hatched pattern, and the cross-hatched pattern is angled about 45° with respect to an edge of the liner 126. When the release liner 126 is removed from the adhesive layer and the article 110 is applied to a substrate, the channels in the adhesive layer created by the ridges in the release liner allow fluid trapped at the interface between the adhesive and the substrate to escape to a periphery of the article and be exhausted into the surrounding atmosphere.

The cross-sectional shape of the ridges 128 can vary widely according to the processing methods used to make them, but each preferably has a V-shaped or trapezoidal cross section on observation in a transverse direction. The limits of dimensions of the ridges can be described by their aspect ratio. The aspect ratio is defined as the ratio, in a cross sectional view perpendicular to: (1) the plane of the liner 126, and (2) the longitudinal direction of a ridge 128, of the greatest microscopic dimension of the ridge parallel to the plane of the liner (See $W_1$ in FIG. 6) to the greatest microscopic dimension of the ridge channel perpendicular to the plane of the liner (See $W_2$ in FIG. 6). Depending on the specific type of ridge and the ridge design considerations outlined above, the limits of the aspect ratio are preferably about 0.1 to about 100, more preferably about 1 to about 10.

Figure 6:
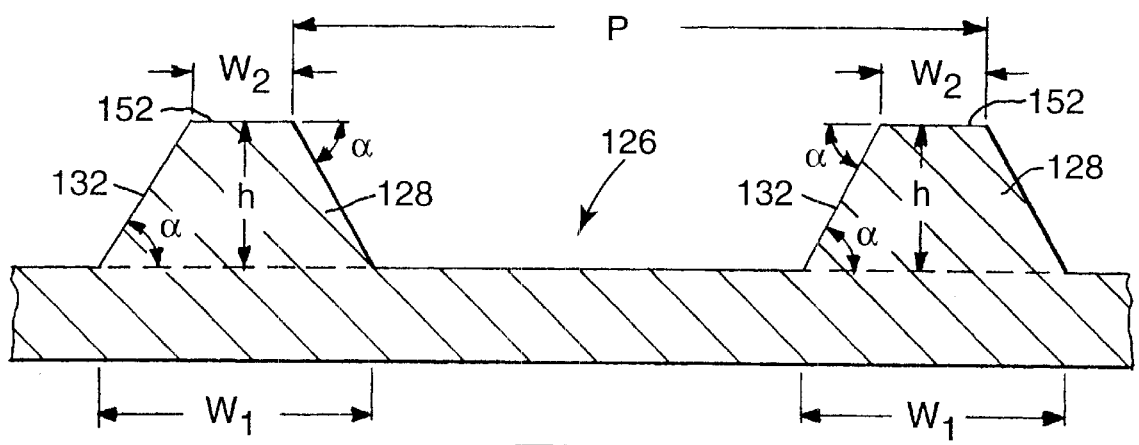
FIG. 6 is a cross-sectional view showing the surface configuration of a release liner suitable for use in the process of the present invention.

In the release liner used in the coating process of the invention, the structures have a specific shape and a size to provide reduced air bubble formation during coating processes and enhance coating speed. FIG. 6 demonstrates the dimensions and characteristics of the structures on the surface of the liner 126 of the invention that provide these properties.

Referring to FIG. 6, the liner 126 has structures that form a plurality of ridges 128. The pitch P between the ridges 128 may be about 125 μm to about 2500 μm, preferably about 150 μm to about 1300 μm, and should preferably be greater than about 170 μm, more preferably greater than about 250 μm. The height h of each ridge 128 from a plane of the liner 126 is about 3 μm to about 45 μm, preferably about 10 μm to about 30 μm. The width of the ridge 128 $W_1$ at its base is less than about 200 μm. The distance across the top 152 of the ridge 128 is about 0 μm to about 200 μm. The ridge 128 has at least one sidewall 132 that makes an angle a with respect to a plane of the surface of the liner 126. The angle α may be selected from an angle greater than 0° and less than 90°, measured with respect to the plane of the surface of the liner 126, necessary to provide reduced air entrapment and bubble formation for a coating solution of a selected rheology. The angle α is preferably less than about 60°, more preferably about 20° to about 60°, most preferably about 30° to about 50°. This shape reduces the entrapment of air as the coating moves over the liner 126 during coating operations.

Any coating solution may be coated onto the release liner 126. The coating solutions used in the coating processes of the invention preferably include adhesives, and solutions of pressure sensitive adhesives are particularly preferred. Classes of pressure-sensitive adhesives include acrylics, tackified rubber, tackified synthetic rubber, ethylene vinyl acetate, silicone, and the like. Suitable acrylic adhesives are disclosed, for example, in U.S. Pat. Nos. 3,239,478, 3,935, 338, 5,169,727, U.S. Pat. No. RE 24,906, U.S. Pat. Nos. 4,952,650, and 4,181,752. A suitable class of pressure-sensitive adhesives is the reaction product of at least one alkyl acrylate with at least one reinforcing comonomer. Suitable alkyl acrylates are those having a homopolymer glass transition temperature below about −10° C. and include, for example, n-butyl acrylate, 2-ethylhexylacrylate, isoctylacrylate, isononyl acrylate, octadecyl acrylate and the like. Suitable reinforcing monomers include, for example, acrylic acid, itaconic acid, isobornyl acrylate, N,N-dimethylacrylamide, N-vinyl caprolactam, N-vinyl pyrrolidone, and the like.

The adhesives used in the process of the invention are typically polymers that may be dispersed in a solvent or water to provide a coating solution of a selected rheology. The rheology of the solution may also be adjusted using various additives known in the art. The coating solution is typically bar or knife coated onto the release liner as shown in FIG. 4, subsequently dried, and optionally crosslinked. If a solvent borne or waterborne pressure-sensitive adhesive composition is used as a coating solution, then the adhesive layer may undergo a drying step to remove all or a majority of the carrier liquid. Additional coating steps may be necessary to achieve a smooth surface. The adhesives may also be hot melt coated onto the release liner. Additionally, monomeric pre-adhesive compositions can be coated onto the liner and polymerized with an energy source such as heat, UV radiation, e-beam radiation, and the like.

EXAMPLES

Liner and adhesive samples were evaluated using light microscopy with a JENA JENAVERT (Jena, Germany) incident light microscope or Bausch and Lomb stereo microscope (Bausch & Lomb, Rochester, N.Y.), or interferometry microscopy using a WYKO RST surface profiler (WYKO Corp., Tucson, Ariz.).

Tests

Bubble Count Test: The adhesive layer that has been coated and dried onto the liner is viewed under a visible light microscope at low magnification through a template having a 3.8 mm by 3.8 mm square cutout area. The number of bubbles are counted and evaluated for size. The test is repeated in at least three representative areas and the average number of bubbles calculated. The test can also be performed after lamination of a film onto the adhesive layer and removal of the liner.

Peel Adhesion Test: Adhesion tests of the graphics to substrates are a modification of ASTM method D3330 (1992) and Pressure Sensitive Tape Council method PSTC-1 (1989). Caustic etched and acid desmut aluminum test panels (6061 T6, Q-Panel Co., Phoenix Ariz.) and painted aluminum test panels (Fruehauf, Indianapolis, Ind.) are cleaned with a solvent available from E.I. DuPont de Nemours, Wilmington, Del., under the trade designation PrepSol, and allowed to dry. Samples of pressure sensitive adhesive and film on liner are cut into 2.54 cm wide strips. The release liner is removed, and the strips are applied to the panels using either a PA-1 Hand Applicator (available from Minnesota Mining and Manufacturing Company (3M) St. Paul Minn.) at a speed of about 2.5 centimeter/second or a Vanquisher roll laminator (Stoughton Machine and Manufacturing Co., Inc., Stoughton Wis.) at 40 psi gauge pressure and a speed of about 2.5 cm/second. A backing strip of 2.54 centimeter wide film available from 3M under the trade designation Scotchcal Series 3650 adhesive film is laminated in registration onto each sample strip. The backing film prevents the sample films and pressure sensitive adhesive from excessively stretching during peel back testing. After 24 hours in a constant temperature and humidity room at 22° C. and 50% relative humidity or after 7 days at 66° C. followed by 24 hour equilibration in the constant temperature and humidity room, peel adhesion is measured as a 180 degree peel back at a crosshead speed of 30.5 centimeters per minute using a Lloyd 500 tensile tester (Lloyd Instruments, Segensworth Fareham England). The samples may be processed or unprocessed. Processed film samples are coated with printing inks and transparent coatings.

Tenting of Graphic on Corrugations and Rivets and Overlap Test: On a 12 inch by 4 inch (30.5 cm by 10 cm) corrugated Fruehauf painted panel having four 12 mm diameter by 2.5 mm high rounded rivets, is applied a test film having dimensions of 2.5 inch 12 inch (6.4 cm by 30.5 cm). The film is applied to the test panel using a plastic squeegee, ensuring that the film conformed to the corrugations and completely cover the four rivet heads. A second piece of the same film, 1 inch by 12 inch (2.5 cm by 30.5 cm), is applied in the same manner on one edge of the first layer of applied film, such that about 0.5 inch (1.3 cm) width of the second strip overlaps and adheres to the first film and about 0.5 inch (1.3 cm) width of the second strip adheres only to the panel. The surrounding area around the rivet heads is heated with an electric heat gun to soften the film without melting it. Using a rivet brush, the film is brushed around the rivet heads so that the film is deformed, and tight, conforming bond is obtained between the film, the rivets and surrounding area, and in the valleys with no observable bridging of the film (tenting). The test panels are set aside for 24 hours at 72° F. (22° C.)/50% relative humidity. After 24 hours the any lifting in the valleys, tenting around the rivet heads, and tendency of the overlap strip to peel back upon itself is evaluated. The test panels are placed in a 150° F. (66° C.) oven for 7 days and reevaluated.

Indent Panel Test: A circular indent is made in 0.7 mm thick aluminum test panel using a hemispherical drop hammer with a tip diameter of 2.5 cm. The indent was about 2.8 cm diameter at the plane of the panel and was about 0.6 cm deep. A 7.5 cm by 7.5 cm test sample to be tested was centered over the indent and applied flat onto the panel and taut over the indent. A PA-1 Hand Applicator with a protective sleeve (SA-1, available from 3M) was used to press the sample onto the panel using a mass of about 1 kg. Then the film was pressed with a thumb into the depressed indent. At least 3 kg of mass was applied. The ability of the sample to conform into the indent and uniformly contact the depressed panel indent was rated as follows:

0 sample would not conform significantly into the indent against the entrapped air 1 sample could be pressed down into the indent to the extent of about 50%

2 sample could be pressed down to conform with much of the indent leaving small air bubbles 3 sample could be pressed down to conform slowly (greater than 5 seconds) and completely into indent 4 sample could be pressed down to conform swiftly (less than 5 seconds) and completely into the indent Rivet Panel Test: A test sample was manually pressed over a 12 mm diameter by 2.5 mm high rounded rivet onto a Fruehauf flat panel with rivets by starting at the edges of the sample 3.8 cm from the center of the rivet. The sample was pressed down, using both thumbs, with thumb pressure (approximately 750 g for each thumb) at the periphery using a circular motion to entrap a large air pocket under the film. The film was then pressed in at the edge of the air pocket towards the rivet keeping thumbs at opposite sides of the rivet and making half-circular motions in alternating directions with decreasing radii to keep the thumbs along the margin of the pocket (approximately 750 g for each thumb). The force was limited so as not to burst the film. This procedure ensured that a large air pocket was formed under the sample and was prevented from being pushed under the film, to the sample edge by debonding of the pressure sensitive adhesive. The time required for dissipating the air pocket and conforming the film to within 2 mm of the rivet was determined. If a large air pocket remained after 5 minutes of working the film, the diameter of the air pocket was determined. Samples with best air dissipation generally required less than about 30 to 60 seconds to conform the film up to the rivet. Poorest samples entrapped about a 35 mm (or larger) air pocket after 5 minutes of working application.

Rivet/Corrugated Panel Test: A sample was applied by hand onto a 10 cm by 30.5 cm painted aluminum Fruehauf corrugated panel having four 12 mm diameter by 2.5 mm high rounded rivets. The sample was large enough to cover a substantial portion of the panel. The degree of ease of pressing the sample into the valleys and conformably onto the rivets to prevent air entrapment was evaluated.

Examples 1 to 12

Release liners were microembossed to form patterns of protruding ridges on the front side surface. The liners generally had about 125 $\mu$m paper core, about 25 $\mu$m polyethylene with a matte finish on the back side, about 25 $\mu$m polyethylene with a glossy finish on the front side, and a commercial silicone coating on the glossy polyethylene side. Each set of patterns was formed under heat and pressure using an engraved embossing tool. Each engraved pattern was an array of two sets of intersecting parallel grooves forming a square grid array oriented 45 degrees from the axis of the tool. Comparative samples having no microembossed ridges were also evaluated. The average dimensions are shown in Table 1 below. The sidewall slopes were determined by microscopic examination of cross-sections.

TABLE 1

| | | | Dimensions | | |
|---|---|---|---|---|---|
| Example | Ridges per inch (one direction) | Sidewall Slope (°) | Width at base W1 ($\mu$m) | Top Width W2 ($\mu$m) | Height h ($\mu$m) |
| 1 | 0 | | | | |
| 2 | 20 | 90 | 90–100 | | 28 |
| 3 | 20 | 60 | 74 | 41 | 23 |
| 4 | 20 | 45 | 90 | 30 | 25 |
| 5 | 20 | 30 | 115 | 23 | 24 |
| 6 | 50 | 54 | 42 | 12 | 20 |
| 7 | 50 | 30 | 68 | 13 | 18 |
| 8 | 75 | 56 | 25 | 9 | 25 |
| 9 | 87.5 | 63 | 43 | 11 | 22 |
| 10 | 100 | 30 | 55 | 6 | 16 |
| 11 | 125 | 54 | 41 | 12 | 20 |
| 12 | 150 | 30 | 67 | 7 | 18 |

Organic solvent acrylic adhesive coating solutions (described as Adhesive Solution 1 in U.S. Pat. No. 5,296,277 and modified with 18.5 phr of a resin available from Arizona Chemical Co. under the trade designation Nirez 2019 from Arizona Chemical Co.) having viscosities from 2700 to 3700 cps were applied to the liners using a notch bar coater at speeds of 100 feet/min and oven dried. Notch bar gaps were set to afford 0.9 to 1.3 mil thick dry PSA layer. The exposed adhesive side of these samples were laminated at room temperature to a 46 micron thick plasticized, flexible and conformable vinyl (PVC) film identical to that used in films available from 3M under the trade designation Controltac Plus Graphic Marking Film Series 180. The adhesive layer of each sample was evaluated by the Bubble Count Test and the average number calculated for each series. Bubble sizes ranged from very small (about 25 $\mu$m) to, more generally, about 50 $\mu$m diameter up to 100 $\mu$m diameter. Large bubbles ranged up to 150 to 300 $\mu$m diameter.

The results (Table 2) show that lower sidewall slopes under similar coating conditions afforded better adhesive replication (fewer and smaller bubbles). For 20 lpi materials, coating improved as the slope decreased from 90 degrees to 60, 45, and 30 degrees, giving fewer and smaller bubbles. For 50 lpi materials, a slope of 30 degrees gave improved coating relative to 54 degree slopes. For more closely spaced geometries, coating replication became worse as the spacing decreased. However, samples with 30 degree sidewall slope clearly showed the trend of improved coating quality.

| Sidewall Angle | 0 lpi | 20 lpi (1270 μm) | 50 lpi (518 μm) | 75 lpi (339 μm) | 87.5 lpi (290 μm) | 100 lpi (254 μm) | 125 lpi (203 μm) | 150 lpi (169 μm) |
|---|---|---|---|---|---|---|---|---|
| 90° | | 14 (large) | | | | | | |
| 72° | | | | 56 (75–300 μm) | | | | |
| 60° | | 4 (large) | | | | | | |
| 54° | | | 20 (80 μm) | | 63 (100–250 μm) | | 172 (25–150 μm) | |
| 45° | | 4 (small) | | | | | | |
| 30° | | 2.5 (v. small) | 7 (80–100 μm) | | | 23 (75–100 & 150–300 μm) | | 224 (25–100 μm) |
| 0° | 0 | | | | | | | |

Patterns: square grids at 45 degrees bias to web direction, trapezoidal ridges except for 90° U shape.

Using similar constructions, removal of the liner exposed an adhesive layer having essentially an inverse topography of relatively flat adhesive lands and continuous microchannels. The microchannels had essentially the same shape as the liner ridges. The adhesive backed films were evaluated for air bleed application performance (including the Indent Panel Test and the Rivet Panel Test), as well as general ease of application performance (e.g., the Rivet/Corrugated Panel Test). Adhesion and holding performance were evaluated using the Peel Adhesion Test and Tenting of Graphic on Corrugations and Rivets and Overlap Test. The results showed excellent application, air bleed, and adhesion performance properties for the samples made from the liners of the current invention and were comparable or better than samples made from the liners of Example 2. Samples made from liner of Example 1 showed no air bleed properties.

The constructions were evaluated for the effect of the coating bubbles on appearance. The 20 lpi 30 degree sidewall slope sample (Example 5) had fewer defects than the 20 lpi 90 degree sidewall slope sample (Example 2). The 50 lpi 30 degree sidewall sample (Example 7) appeared much smoother and was visually acceptable compared to the rougher appearing 50 lpi 54 degree sidewall sample (Example 8).

Examples 13 and 14

Two liners having a 20 line per inch grid pattern and sidewall angles of 90 degrees (Example 2) and 30 degrees (Example 5) were coated with the adhesive solution. The liner with ridge sidewall slope of 90 degrees required limitation of coating speed to 90 fpm to control the coating bubbles. The liner with ridge sidewall slope of 30 degrees slope was coated at a speed of 130 fpm and gave fewer coating bubbles.

Examples 15–20

An adhesive formulation was made from 140 parts of UCAR Latex 9168 (available from Union Carbide Corporation, Danbury, Conn.), 3.5 parts of Acrysol ASE-60 (available from Rohm and Haas Co., Philadelphia, Pa.), 2 parts of 7% aqueous ammonium hydroxide, 36.5 parts of deionized water, 7.5 parts of n-octanol (Eastman Chemical Co., Kingsport, Tenn.), and 0.10 parts of CE-N 2 Black pigment dispersion (available from Ciba-Geigy, Hawthorne, N.Y.). Liner samples similar to those of Examples 2 to 7 were coated with the adhesive using a notch bar coater with a gap of 5 mils (0.013 cm) and a nominal coating speed of 60 feet (1.83 m) per minute. The samples were dried for about 10 minutes in a 66° C. oven. The PSA layers were evaluated by the Bubble Count Test. The average bubble count from at least four determinations are shown in Table 3.

TABLE 3

| Example | Liner Sample (Example Number) | Ridge Lines per inch | Ridge Sidewall Slope | Bubbles per 3.8 mm × 3.8 mm area |
|---|---|---|---|---|
| 15 | 2 | 20 | 90 | 19.2 |
| 16 | 3 | 20 | 60 | 13.5 |
| 17 | 4 | 20 | 45 | 2 |
| 18 | 5 | 20 | 30 | 0.9 |
| 19 | 6 | 50 | 54 | 13.5 |
| 20 | 7 | 50 | 30 | 3.7 |

A number of embodiments of the invention have been described. Nevertheless, it will be understood that various modifications may be made without departing from the spirit and scope of the invention. Accordingly, other embodiments are within the scope of the following claims.

What is claimed is:

1. A method for enhancing coating speed comprising applying an adhesive to a surface, wherein the surface comprises an arrangement of structures thereon, wherein the structures form a substantially continuous pattern on the surface and extend upward from a plane of the surface, wherein the structures have a pitch of about 500 μm to about 2500 μm and have at least one sidewall that makes an angle with respect to the plane of the surface of about 30° to about 40° wherein the angle is selected to reduce air bubble formation for a coating solution of a selected rheology.

2. The method of claim 1, wherein the coating speed is 60 fpm or greater.

3. The method of claim 1, wherein the coating speed is 90 fpm or greater.

4. The method of claim 1, wherein the coating speed is 130 fpm or greater.

5. The method of claim 1, wherein the structures are ridges.

6. The method of claim 5, wherein the ridges are overlapping.

7. The method of claim 5, wherein the ridges have a substantially trapezoidal cross-sectional shape with a substantially flat top.

8. The method of claim 1, wherein the structures form a substantially regular pattern on the surface.

9. A method for reducing air entrapment in a coating process, comprising applying an adhesive to a surface, wherein the surface comprises an arrangement of structures thereon, wherein the structures extend upward from a plane of the surface, wherein the structures have a pitch of about 500 $\mu$m to about 2500 $\mu$m and have at least one sidewall that makes an angle with respect to the plane of the surface of about 30° to about 40° wherein the angle is selected to reduce air bubble formation for a coating solution of a selected rheology.

10. A method for making an adhesive backed article, comprising applying an adhesive to a release liner, wherein the release liner comprises an arrangement of structures thereon, wherein the structures form a substantially continuous pattern on the surface, wherein the structures extend upward from a plane of the surface, wherein the structures have a pitch of about 500 $\mu$m to about 2500 $\mu$m and have at least one sidewall that makes an angle with respect to the plane of the surface of about 30° to about 40° wherein the angle is selected to reduce air bubble formation for a coating solution of a selected rheology.

11. The method of claim 10, wherein the structures are ridges that form a substantially regular pattern on the surface.

12. The method of claim 11, wherein the ridges have a substantially trapezoidal cross-sectional shape with a substantially flat top.

* * * * *

UNITED STATES PATENT AND TRADEMARK OFFICE
CERTIFICATE OF CORRECTION

PATENT NO.   : 6,524,649 B1
DATED        : February 25, 2003
INVENTOR(S)  : Sher, Frank T.

It is certified that error appears in the above-identified patent and that said Letters Patent is hereby corrected as shown below:

<u>Title page, item [54] and Column 1, lines 1 and 2,</u>
The title should read -- STRUCTED RELEASE LINER AND METHOD FOR COATING THEREON --.

<u>Column 5,</u>
Line 18, "an angle a" should read -- an angle $\alpha$ --.

Signed and Sealed this

Second Day of September, 2003

JAMES E. ROGAN
*Director of the United States Patent and Trademark Office*